United States Patent
Gaudin

(10) Patent No.: US 8,812,598 B2
(45) Date of Patent: Aug. 19, 2014

(54) METHOD AND SYSTEM, IN A PRESENCE AND INTERMEDIATION SYSTEM, TO TRANSFER FROM ONE OWNER TO AT LEAST ONE WATCHER

(75) Inventor: Eric Gaudin, Montrouge (FR)

(73) Assignee: Alcatel Lucant, Boulogne-Billancourt (FR)

( * ) Notice: Subject to any disclaimer, the term of this patent is extended or adjusted under 35 U.S.C. 154(b) by 1531 days.

(21) Appl. No.: 12/300,219

(22) PCT Filed: May 11, 2007

(86) PCT No.: PCT/EP2007/054587
§ 371 (c)(1),
(2), (4) Date: Jun. 26, 2009

(87) PCT Pub. No.: WO2007/131961
PCT Pub. Date: Nov. 22, 2007

(65) Prior Publication Data
US 2009/0276836 A1    Nov. 5, 2009

(30) Foreign Application Priority Data

May 12, 2006    (EP) .................................... 06300463

(51) Int. Cl.
G06F 15/16    (2006.01)
(52) U.S. Cl.
USPC ........... 709/206; 709/201; 709/202; 709/203; 709/204; 709/205
(58) Field of Classification Search
None
See application file for complete search history.

(56) References Cited

U.S. PATENT DOCUMENTS

| | | | |
|---|---|---|---|
| 7,412,527 B2* | 8/2008 | Pulver et al. ................... | 709/229 |
| 7,519,672 B2* | 4/2009 | Boss et al. ...................... | 709/206 |
| 7,685,236 B1* | 3/2010 | Harik et al. .................... | 709/205 |
| 7,814,120 B2* | 10/2010 | Tsutazawa et al. ........... | 707/783 |
| 2002/0023132 A1* | 2/2002 | Tornabene et al. ........... | 709/205 |
| 2003/0037103 A1 | 2/2003 | Salmi et al. | |
| 2003/0037118 A1* | 2/2003 | McAdams ..................... | 709/216 |
| 2003/0135629 A1* | 7/2003 | Sasaki et al. .................. | 709/229 |
| 2004/0003037 A1* | 1/2004 | Fujimoto et al. .............. | 709/203 |
| 2004/0039779 A1* | 2/2004 | Amstrong et al. ............. | 709/204 |
| 2004/0098491 A1 | 5/2004 | Costa-Requena | |
| 2004/0260753 A1* | 12/2004 | Regan ............................ | 709/200 |
| 2005/0033852 A1 | 2/2005 | Tenhunen | |
| 2005/0251675 A1* | 11/2005 | Marcjan et al. ................ | 713/100 |
| 2006/0116139 A1* | 6/2006 | Appelman ..................... | 455/466 |
| 2006/0149740 A1* | 7/2006 | Tsutazawa et al. ............... | 707/9 |
| 2006/0190543 A1* | 8/2006 | Pulver et al. ................... | 709/206 |
| 2007/0016643 A1* | 1/2007 | Boss et al. ...................... | 709/206 |
| 2007/0121867 A1* | 5/2007 | Ozugur et al. ............. | 379/201.1 |
| 2008/0077696 A1* | 3/2008 | Nguyen et al. ................ | 709/229 |
| 2009/0043843 A1* | 2/2009 | Milewski et al. ............. | 709/204 |
| 2011/0314555 A1* | 12/2011 | Horvitz et al. .................. | 726/27 |

* cited by examiner

*Primary Examiner* — Lan-Dai T Truong
(74) *Attorney, Agent, or Firm* — Fay Sharpe LLP

(57) ABSTRACT

Method, in a presence and intermediation system, to transfer from one owner (15) to at least one watcher (17) at least a share of owner's presence information related to at least one owner's buddy (13, 14, 16) in order to enable said watcher (17) to replace the owner (15) toward said buddy (13, 14, 16). Presence and intermediation system comprising means to apply the said method.

22 Claims, 2 Drawing Sheets

METHOD AND SYSTEM, IN A PRESENCE AND INTERMEDIATION SYSTEM, TO TRANSFER FROM ONE OWNER TO AT LEAST ONE WATCHER

The technical domain of the invention is the domain of presence and intermediation systems.

More particularly, the invention concerns a system and method to transfer presence information between an owner and at least one watcher.

A presence and intermediation system allows different users being connected and having subscribed to a presence and intermediation server to gain information about the presence and availability of communication means of other subscribers. Based on that information a user may try to engage in a communication with a present user using at least one of the communication means both users have in common.

Such a system is described, e.g. in patent documents US 2004/0098491, US 2005/0154698 and US 2005/0154698.

Since presence is more and more strategic, presence systems are becoming used more and more each day. It is vital to be available each time a customer or a partner needs to reach you, which is impossible. On telephony side, forwarding tools have been deployed. On presence server side, similar forwarding is not relevant. The possibility to belong to a group has been defined (See e.g. above mentioned US 2005/0154698) but the user loses his individuality and is obliged to share his presence information with the whole group, whereas this information can be confidential. A user then needs to transfer presence information to another defined user able to replace him when he is not available. A manager wants to be seen as being available and will transfer to his assistant. A salesperson wants to be available for his customers even during his holidays so he transfers for this defined time interval its presence to a colleague.

The only known way to obtain such a result before the invention was to grant an access to an assistant/colleague by revealing personal identification and password parameters. Such a way of doing has the drawback of letting the assistant/colleague gain access to the whole presence account without any restriction. Another drawback is that it may lead to complicated problems of security and/or confidentiality. Furthermore to remove the access a user has no other choice than to change his password.

The present invention addresses the problem of managing transfer of presence information between users and solves it while enabling possibilities of gradation of what, how and when a transfer occurs and protecting confidentiality.

The object of the invention is a method, in a presence and intermediation system, comprising the steps of subscribing a first user to allow this first user to be the owner of some presence information related to at least another user, called owner's buddy;

characterized in that, to transfer, from said owner of this presence information to at least another user, called a watcher, at least a share of owner's presence information related to at least one owner's buddy in order to enable said watcher to replace the owner toward said buddy in some actions, it comprises the steps of:
defining by said owner a share of said owner's presence information, in view of authorizing access to this share exclusively;
defining by said owner who will be authorized to access to said share of presence information;
activating the transfer of the presence information by substituting said share of owner's presence information with the watcher's presence information toward said buddy.

According to another feature of the invention, the method further comprises
defining by the owner an availability condition during which access will be authorized.

According to another feature of the invention the availability condition is at least one taken among: a time period, a time interval and a number of connections.

According to another feature of the invention, the method further comprises:
defining transferred intermediation tools.

According to another feature of the invention when said watcher is not a subscriber to the same presence and intermediation system as the owner, said watcher connects to said system via a dedicated client.

According to another feature of the invention said connection uses a specific password.

According to another feature of the invention said password is defined by the owner.

According to another feature of the invention when said watcher is a subscriber to the same presence and intermediation system as the owner, said watcher connects to the presence and intermediation system via his own presence client.

According to another feature of the invention said watcher provides a particular view of its own presence information to owner's buddies.

According to another feature of the invention upon activation of the transfer of the presence information, said buddies receives presence information of the watcher as if it was presence information of the owner.

According to another feature of the invention owner restricts incoming and/or outgoing communications tools available to said watcher.

According to another feature of the invention a buddy contacting the owner through one of intermediation tools available on the system is informed or not informed of the substitution of the owner by the watcher.

According to another feature of the invention said information or not information option is depending on the intermediation tool used for contacting.

According to another feature of the invention, method further comprises sending a notification of transfer to said buddy.

According to another feature of the invention said buddy may refuse to be transferred in response to said notification.

According to another feature of the invention when the owner decides to untransfer a buddy, that buddy is sent a notification of untransfer.

According to another feature of the invention said notifications contains identification of the watcher and/or properties of the transfer.

According to another feature of the invention, method further comprises sending a notification of transfer to said watcher.

According to another feature of the invention said watcher may refuse to be transferred in response to said notification.

According to another feature of the invention when the owner decides to untransfer a buddy from a watcher, that watcher is sent a notification of untransfer.

According to another feature of the invention said notifications contains identification of said buddy and/or properties of the transfer.

According to another feature of the invention if a watcher provides its presence to a buddy of an owner, a special representation figures on said buddy's client and/or on said owner's client.

According to another feature of the invention when a watcher receives presence information from a buddy of an owner, said buddy is identified on watcher's client with a special representation.

According to another feature of the invention when a buddy receives presence information from a watcher replacing its owner said watcher is identified on buddy's client with a special representation.

Another object of the invention is a presence and intermediation system comprising:
- a presence server,
- at least one owner,
- at least one buddy of said owner,
- at least one watcher, comprising means for applying the method according to anyone of the previously described embodiments.

Others features, details and advantages of the invention will become more apparent from the detailed illustrating description given hereafter with respect to the drawings on which:

Figure 1:
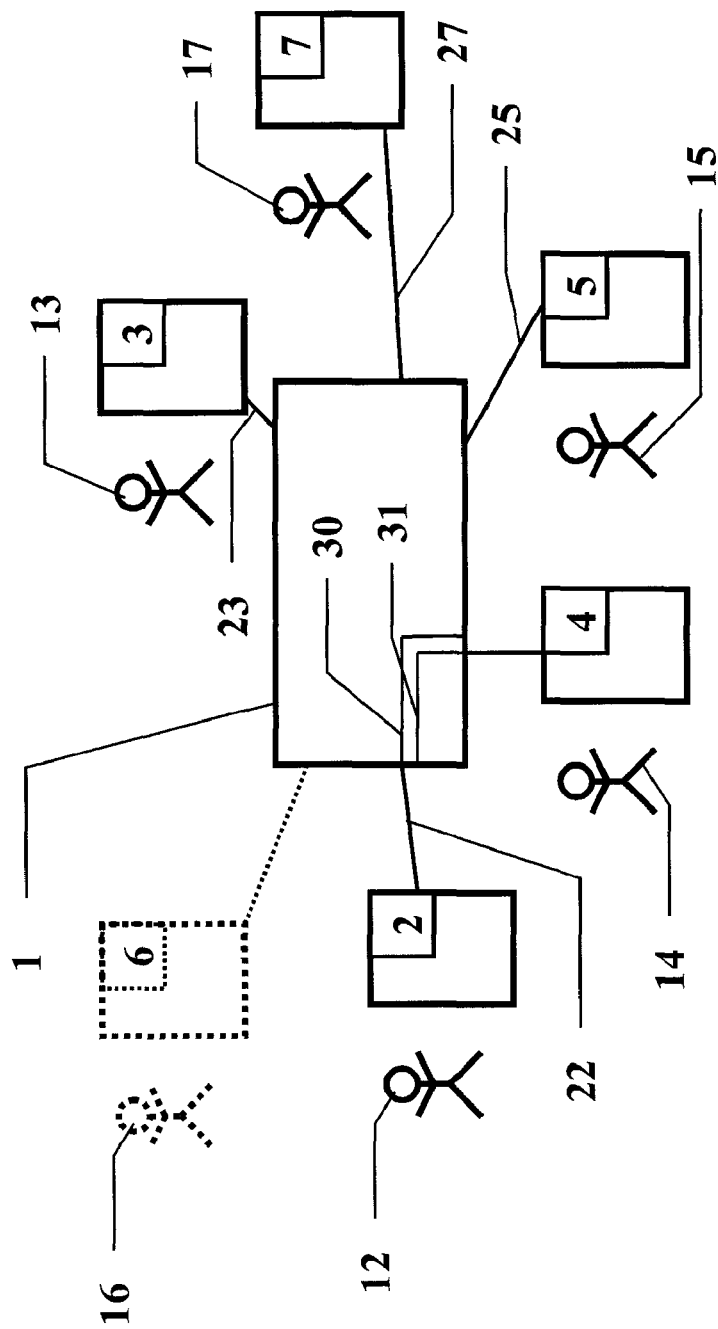
FIG. 1 shows a schematic view of a presence and intermediation system.

According to FIG. 1, a presence and intermediation system comprises a server 1 and a plurality of clients 2-6 linked to the server 1. Here, each client 2-6 is linked by an associated link 22-26, but any linking topology is possible. Another embodiment could be a network, for instance Internet linking all clients 2-6 in order to provide connectivity to the server 1. Each client 2-6 is associated to a respective user 12-16. A user's client 2-6 allows its user 12-16 to interact with the system. Since a user acts through a client and a client is representing its user in the system, both words user and user's client are sometimes used one for the other. According to a setup provided by the user 12-16, a client 2-6 is aware of the presence status and of the intermediation status of its user 12-16. A presence status is an image of the activity of the user. It may be e.g. a value among: absent, free, busy, etc. The intermediation status is an image of the communication tools available at a user's client 2-6 and may be e.g. a record comprising communications tools and their associated state. For example the whole system may support several communications tools such as mail, immediate messaging, file transfer, video or phone services. For each communication tool its state may comprise e.g. a value among: absent (this service is not installed or not available on that client), ready (ready to be used), busy (currently used), etc.

The main goal of the system is to support communications between users 12-16 who have previously subscribed to the system. To reach that goal the system provides to a user 12-16 via its client 2-6 a view of the presence status and intermediation status of others users. With these statuses a communication may be initiated properly by a user who knows when the intended user is present and available and what communication tool to use based on the tools states.

Figure 2:
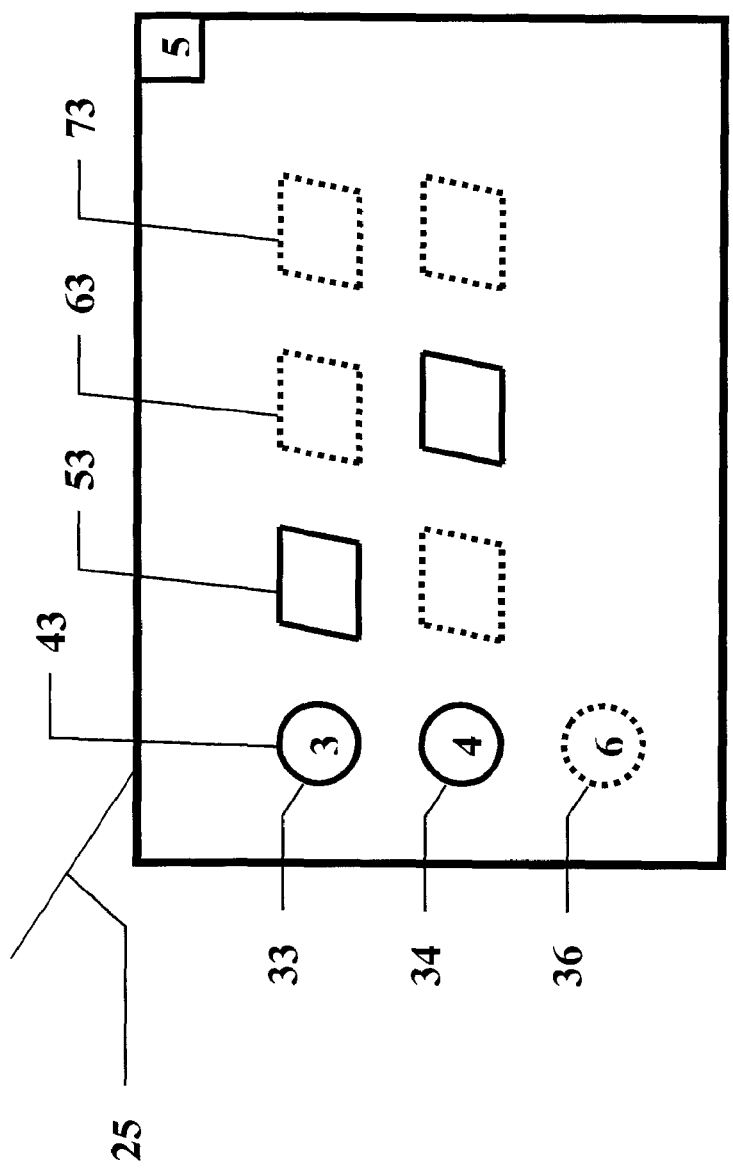
FIG. 2 illustrates a detail of a statuses view provided by a user's client.

Referring to FIG. 2 is shown a detail of such a view appearing on client 5 of user 15. On presence system, users 12-17, or their clients 2-7, can exchange an agreement. They are then linked together and can be called BUDDIES of one another. All users 12-17 having agreed with user 15 pertains to the buddy-list of that user. For the following description we will consider that three users 13, 14, 16 are the buddies of user 15.

User 12 is not a buddy of user 15. On his client 5, by mean of a graphical user interface, GUI, user 15 is provided with a time dynamic view representative of the statuses of his buddies 13, 14, 16. In the present illustration a matrix containing three lines 33-36 (each associated with a client 3-6), a first column 43 corresponding to clients 3, 4, 6 of buddies 13, 14, 16 (featuring the presence status) and three others columns 53-73 (each associated with a communication tool) is figuring these presence and intermediation statuses. E.g. first line 33 figures the statuses of client 3/user 13. Since a slanted square appears in plain line in column 53, it indicates that the communication tool corresponding to that column is available and ready. Others slanted squares at columns 63, 73, appears in dotted lines indicating corresponding communication tools are unavailable. The third line 36 corresponds to a client 6 currently disconnected from the system. Consequently its intermediation status is unknown (or absent) as figured by no slanted squares in last columns 52-72. Also, client 6 appears in dotted line at column 43 featuring its presence status is unknown or user 16 is absent. Since 12 is not a buddy of user 5, hit statuses do not appear. Such a view is regularly updated always indicating the latest values of the statuses. This illustrative view can take many different but functionally similar forms.

Coming back to FIG. 1, system provides intermediation tools to link at least two users together. A communication link is illustrated between user 12/client 2 and user 14/client 4. Here the communication is relayed by the presence server 1 and uses simultaneously two communications tools, e.g. an immediate messaging tool 30 and a video tool 31.

A presence and intermediation system being settle down, we can now come to the invention. The problem of the invention is that a given user 15, that we will call from now an OWNER 15, would like to be able to transfer part of all of the presence (and communication) information including information about his buddies 13, 14, 16, communication possibilities and right he owns with respect to these buddies 13, 14, 16, and his own statuses as it is communicated to his buddies, to an authorised person 17. The authorised replacing person will be called from now a WATCHER 17. Such a transfer is intended to allow a watcher 17 to efficiently replace an owner 15 when the owner 15 decides it. This enable the watcher 17 with means to provide to the owner's buddies 13, 14, 16, the presence and support they are used to or even an extended presence and support. The watcher 17 benefits from the owner's right, tools and even if so setup, from the user's identity, in order to make the owner 15 appear present from his buddies 13, 14, 16 point of view. Then according to the setup, an absent owner 15, after having transferred to at least one watcher 17 may appear to his buddies 13, 14, 16, as being present, the watcher 17 acting as being and in the name of the owner 15. Alternately the transfer may be apparent and the transferred watcher 17 acts as openly replacing the owner 15.

To achieve such a transfer from an owner 15 to at least one watcher 17, the method according to the invention comprises the steps of:
- first, the owner 15 defines what he transfer, and the exact share of his presence information on which he decides to exclusively authorize access;
- second, the owner 15 defines who is authorised to access to said information;
- third the transfer is activated by substituting the owner's presence information with the watcher's presence information toward said buddy.

The aim of such a transfer is to enable said "receiving" watcher 17 to efficiently replace the owner 15 toward said buddy 13, 14, 16 in some actions. For that purpose the share of presence information that is transferred may comprise: part or all of the information about owner's buddies, access rights to use some intermediation tools available to the owner, presence statuses of the owner as broadcast among the system, tools statuses of the owner and even the owner identity. The owner 15 grants access to the watcher 17 to presence information of some or all of his buddies 13, 14, 16 together with the means to manage these buddies as the owner 15 would have done. After transferring the watcher 17 receive all presence information from said owner's buddies 13, 14, 16 that would normally be sent to the owner 15. The watcher 17 also sends his own presence status to the owner's buddy instead of the owner's presence status.

At a second step, the owner 15 has to define to whom said share of presence information will be transferred. This can be done in many ways: either by a direct designation of a watcher 17 associated to a transferred buddy 13, 14, 16 or by defining a condition the watcher 17 has to meet, such as e.g. a connecting password. Since several watchers 17 are allowed, a given buddy 13, 14, 16 may be assigned to a watcher 17 during this step.

After these two configuring steps, the transfer may be activated by the owner 15. The activation step includes a substitution of said share of owner's presence information previously defined with the watcher's presence information.

As a default rule, a transfer is activated without limitation and applies until the owner 15, or the watcher 17, interrupts it. According to another feature of the invention the method may further comprise a step defining by the owner 15 an availability condition during which access will be authorized. Such availability may be a time period, i.e. a duration starting from now. It can also be a time interval, i.e. two times/dates the condition being true between these two times/dates. Based on time, a condition may also be any definition such as for example: everyday from 6:00 PM to 9:00 PM, every Friday or etc. Another way to define an availability condition of the transfer may be based on an event, e.g. a number of connections. The transfer to a watcher 17 is then activated until that watcher 17 has established a predefined number of connections with corresponding buddies 13, 14, 16.

The configuration step may comprise the definition of intermediation tools the owner 15 want to transfer, i.e. that the watcher 17 may use as if he were the owner 15. For example owner 15 may grant the use of immediate messaging service to a watcher 17 for a given buddy and prohibits the use of phone service. The owner defines for each transfer what tool may be used and how.

An owner 15 which want to transfer some (or the whole) presence information must:

1. Define which part of the own buddies information list to transfer
   one or more buddies
   one or more group of buddies
   the whole buddies list
   transfer different buddies/groups with different watchers
   transfer the whole presence information
   transfer personal information such as phone number or any other information which appears on the owner presence server client
   transfer only a part of the presence information or of the information (i.e. define what to share
2. Define to whom to transfer
   one (or more) watcher which belong to the buddy list
   one (or more) watcher which not belong to the buddy list
   one (or more) watcher which are registered on the present presence server
   one (or more) watcher which are NOT registered on the presence server
3. Define availability of the transfer
   the transfer can be permanent
   the transfer can be limited on time (hour/day/year, . . . )
   the transfer can be limited to a number of connection
   the transfer can be limited to a fixed period (15 on July to 15 on August)
4. Defines transferring intermediation tools
   forward, or not, all or a part of his own intermediation tools (phone/IM/video/ . . . ) for incoming events. A buddy which would try to reach the owner 15 through a defined tool will be redirected to the watcher 17.
   allows or not the watchers 17 to send outgoing events (phone/IM/ . . . ) with the identification of the owner 15. That's mean the watcher 17 will be able to send events (phone call/IM/Video/ . . . ) with the identity of the owner 15.
   define or not which intermediation tool the watcher can use for this transfer as if they belong to him.

The owner 15 can grant access to watchers 17 through different ways.
the owner uses a special GUI.
This special GUI can be accessible from the owner client.
The owner 15 has the possibility from this special GUI to:
select or fill a list of buddies and associate to them one or more watcher 17,
configure particular properties such as availability of the transfer,
consult the different association he had already make,
manage, change or delete association between buddies and watchers,
Buddies group management
The owner 15 has the possibility to:
create group(s) of buddies on his client 5,
provide different properties to these different groups,
beyond these properties, the owner 15 has the possibility to provide one or more watcher 17 for this group,
activate/inactivate the transfer,
configure transfer options such as availability.

A watcher 17 is not necessary a subscriber to the same presence and intermediation system as the owner 15. The presence server 1 then provides a dedicated client 7 for the watcher 17 to be able to connect to the system.

Since this dedicated client 7 is an open access client said connection must be secured and the access limited only to an authorised watcher 17. An authentication by way of a password is a suitable mean.

Advantageously, said password is defined by the owner 15. The owner 15 grants access to the system to a transferred watcher 17 by communicating the password to him Alternately, a watcher 17 may be a subscriber to the same presence and intermediation system as the owner 15. Then the watcher 17 may connect to the presence and intermediation system via his own presence client 7.

When a watcher 17 is transferred from an owner 15, he can provide a particular view of its own presence information to owner's buddies 13, 14, 16. The watcher 17 plays two roles. First he acts as a normal user and provides his own presence information statuses to others users, including owner's buddies. Second he acts as if he was the owner 15 and provides a corresponding "aliased" owner presence information status, mainly toward owner's buddies 13, 14, 16. Depending on a chosen transparency a particular view may be provided. In case of non transparency, the watcher 17 does not appear. He acts and appears as if he was the owner 15, using the owner's identity. An owner's buddy 13, 14, 16 may think he interacts with the owner 15 himself. In case of transparency, the watcher 17 appears as an authorised user substituted to the owner 15. The watcher 17 may then provides on one hand a presence status corresponding to the owner's role. On another hand, he may provide in addition a particular view of a presence status corresponding to his own role.

The system, via the presence server 1, always tracks the values of the presence and intermediation statuses of the users. These values are regularly broadcast via the links 22-27 or via the network connecting the clients 2-7, in order to advertise theses statuses to the authorised i.e. buddies. Upon activation of a transfer an owner's buddy 13, 14, 16 receives presence information of the transferred watcher 17 as if it was presence information of his owner 15. That means the statuses information that would have been advertised to a buddy 13, 14, 16 via the links/network, from his owner 15 are replaced by the statuses information of the watcher 17 instead. This is obtained by redirecting corresponding advertising information messages.

In accordance to the configuration set up before transferring, the owner 15 restricts incoming and/or outgoing communications ways i.e. intermediation tools usable by a watcher 17 when assuming the owner role while transferred. For example, an owner's configuration may choose to transfer a buddy or a group of buddies to a watcher 17, but that watcher 17 is restricted to use only immediate messaging with respect to said transferred buddy or group of buddies. In case of non transparency it may be advisable to prohibit the use of e.g. phone service, which would reveal the substitution of the owner 15 with the watcher 17.

Depending on transparency policy whished, when a buddy 13, 14, 16 contacts the owner 15 through one of intermediation tools available on the system, the buddy 13, 14, 16 is informed (transparency) or not informed (non transparency) of the substitution of the owner 15 by the watcher 17.

According to a particular embodiment an option for a choice between information and not information may be configured to be dependent on the intermediation tool selected to contact the owner 15. Thus, a configuration may provides for a limited transparency where a buddy 13, 14, 16 will not be informed of the substitution (and he may carry on thinking he is contacting the owner 15) for intermediation tools such as immediate messaging or mail services, but before engaging into a phone service communication, the buddy 13, 14, 16 will be informed that he is transferred and that his contact is redirected to a/the watcher 17 instead of its owner 15.

When or before activating a transfer some notifications may be sent to the parties. Thus a notification of transfer is sent to inform a buddy 13, 14, 16 that he will participate to a transfer and how.

According to a particular embodiment, said notified buddy 13, 14, 16 may then respond to indicate he refuses to be so transferred.

A notification of untransfer i.e. end of transfer may also be sent to inform a buddy 13, 14, 16 that he has been deselected from a previously established transfer.

Advantageously both of these notifications to buddies contain identification of the watcher 17 and/or properties of the transfer.

Correspondingly, a notification of transfer may be sent to the watcher 17, and watcher may respond to said notification by refusing the transfer.

Correspondingly also, a notification of untransfer may be sent to the watcher 17, when an owner 15 opt to untransfer a buddy 13, 14, 16 from that watcher 17.

Advantageously both of these notifications to watcher 17 contain identification of the buddy 13, 14, 16 and/or properties of the transfer.

According to an embodiment of the invention when a watcher 17 provides its presence statuses to a buddy 13, 14, 16 of an owner 15, i.e. in case a transfer is activated, a special representation figures on said buddy's client 3, 4, 6 and/or on said owner's client 5 may inform of the transfer. A special representation may be e.g. a particular graphical symbol on the said client 3, 4, 5, 6 graphical user interface.

Accordingly when a watcher 17 receives presence information from a buddy 13, 14, 16 of an owner 15, said buddy is identified on watcher's client 7 with a special representation used to display the statuses of said buddy 13, 14, 16. This may be useful for the watcher 17 to differentiate the owner's buddies 13, 14, 16 from his own buddies.

Similarly when a buddy 13, 14, 16 receives presence information from a watcher 17 replacing its owner 15 said watcher 17 may be identified on buddy's client 3, 4, 6 with a special representation. This, in the case of transparency, contributes to inform the buddy 13, 14, 16 that his owner 15 has been transferred to a watcher 17.

The invention claimed is:

1. A method, in a presence and intermediation system, wherein a first user, called an owner, subscribes to said presence and intermediation system, the owner having associated therewith presence information related to at least one other user of the presence and intermediation system, called a buddy, said method comprising:
   defining a share of said presence information associated with said owner to transfer to at least one other user of the presence and intermediation system, called a watcher, said share of said presence information associate with said owner including at least an indication of an availability of the owner, wherein the owner, the watcher and the buddy are different;
   defining who will be authorized to access said share of said presence information associated with said owner;
   activating a transfer of the share of said presence information associated with said owner by substituting said share of said presence information associate with said owner with presence information associated with said watcher which is related to said buddy such that in accordance with the activation of the transfer of the owner's presence information, said buddy receives presence information of the watcher as if it was presence information of owner; and
   replacing said owner with said watcher at least with respect to said buddy in the presence and intermediation system such that said watcher is permitted to take at least some actions in the presence and intermediation system on behalf of the owner at least with respect to said buddy.

2. The method according to claim 1 further comprising:
   defining an availability condition during which the watcher will be authorized to access the share of presence information associated with said owner.

3. The method according to claim 2 wherein the availability condition is at least one taken among: a time period, a time interval and a number of connections.

4. The method according to claim 1 wherein said watcher is not a subscriber to the presence and intermediation system and said watcher connects to said presence and intermediation system via a dedicated client.

5. The method according to claim 4 wherein the watcher connects to the presence and intermediation system using a specific password.

6. The method according to claim 5 wherein said specific password is defined by the owner.

7. The method according to claim 1 wherein said watcher is a subscriber to the presence and intermediation system and said watcher connects to the presence and intermediation system via his own presence client.

8. The method according to claim 1 wherein said watcher provides a particular view of the watcher's own presence information to owner's buddies.

9. The method according to claim 1 wherein upon activation of the transfer, said buddies receive presence information of the watcher as if the presence information of the watcher was the presence information of the owner.

10. The method according to claim 1 wherein owner restricts incoming and/or outgoing communication tools available to said watcher.

11. The method according to claim 1 wherein the buddy contacting the owner through one of intermediation tools available on the system is informed or not informed of the substitution of the owner by the watcher.

12. The method according to claim 11 wherein an information or not information option is depending on the intermediation tool used for contacting.

13. The method according to claim 1 further comprising sending a notification of said transfer to said buddy.

14. The method according to claim 13 wherein said buddy may refuse to be transferred in response to said notification.

15. The method according to claim 13 wherein said notification contains identification of the watcher and/or properties of the transfer.

16. The method according to claim 1 further comprising sending a notification of said transfer to said watcher.

17. The method according to claim 16 wherein said watcher may refuse to be transferred in response to said notification.

18. The method according to claim 16 wherein said notification contains identification of said buddy and/or properties of the transfer.

19. The method according to claim 1 wherein when a watcher provides the watcher's presence information to the a buddy of an the owner, a special representation appears on said buddy's client and/or on said owner's client.

20. The method according to claim 1 wherein when a watcher receives presence information from the buddy of the owner, said buddy is identified on watcher's client with a special representation.

21. The method according to claim 1 wherein when the buddy receives presence information from the watcher replacing the presence information of the owner, said watcher is identified on the buddy's client with a special representation.

22. A presence and intermediation apparatus comprising:
a presence server to which a first user, called an owner, subscribes, said owner being associated with presence information related to at least another user, called a buddy;
at least one owner's client device; and
at least one buddy's client device;
wherein said presence server is equipped to permit the owner to define a share of the presence information associated with the owner to transfer said share of said presence information associate with said owner including at least an indication of an availability of the owner, and to define who will be authorized to access to said share of the presence information associated with the owner, and to activate the transfer of the share of the presence information associated with said owner by substituting said share of said presence information associated with said owner with presence information of a watcher with respect to said buddy, and to replace said owner with said watcher at least with respect to said buddy in the presence and intermediation system such that said watcher is permitted to take at least some actions in the presence and intermediation system on behalf of the owner at least with respect to said buddy; and
wherein said owner, watcher and buddy are different and such that in accordance with the activation of the transfer of the owner's presence information, said buddy receives presence information of the watcher as if it was presence information of owner.

* * * * *